Patented May 15, 1923.

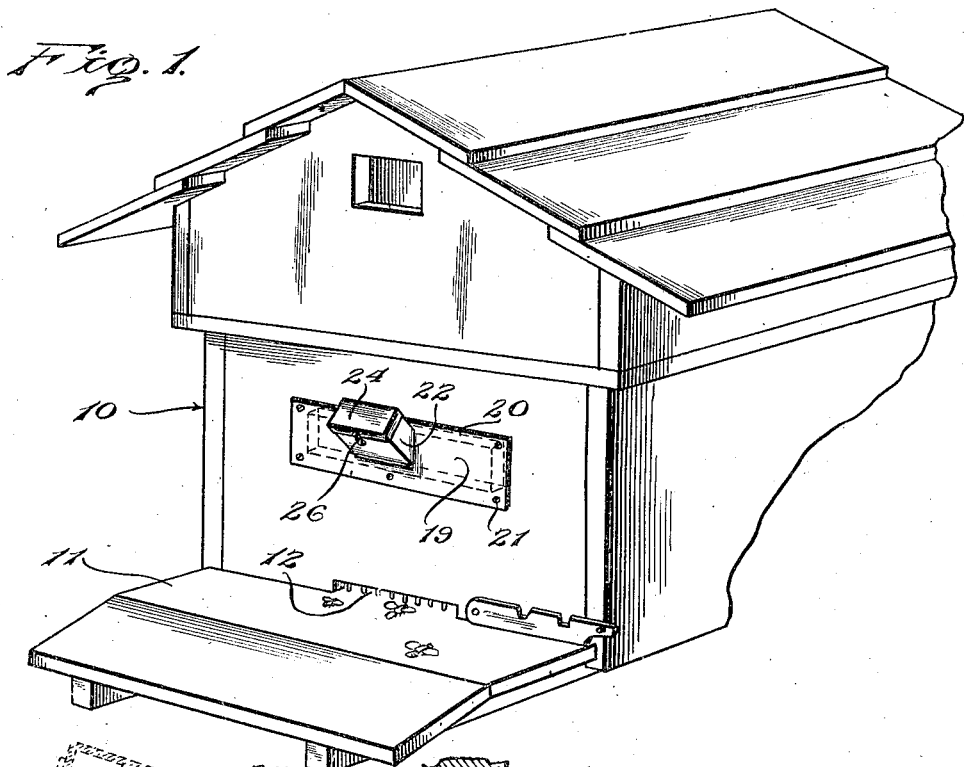

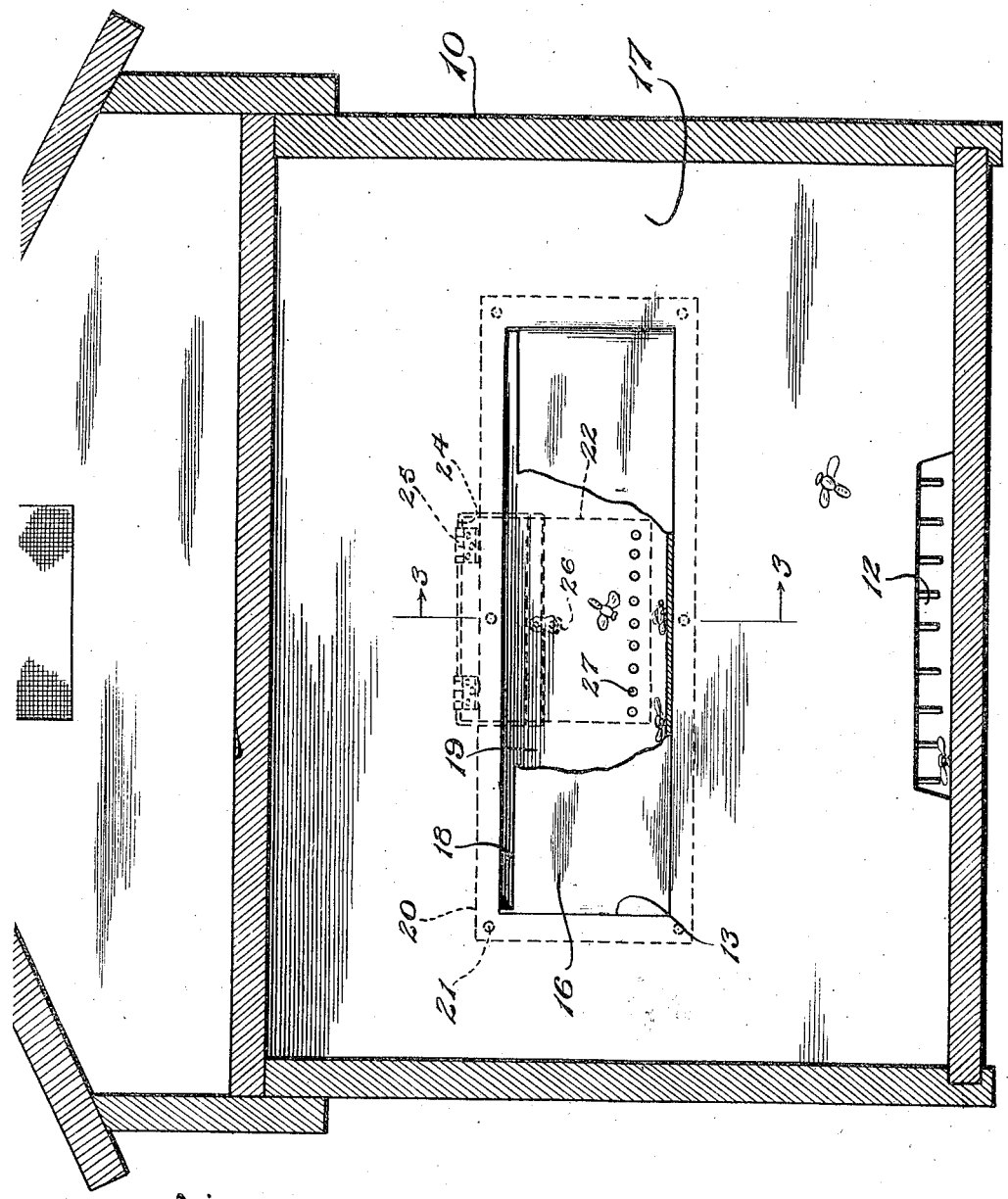

1,455,459

UNITED STATES PATENT OFFICE.

BIAGIO TROILO, OF ONEIDA, NEW YORK.

FEED BOX FOR BEES.

Application filed August 21, 1922. Serial No. 583,312.

*To all whom it may concern:*

Be it known that I, BIAGIO TROILO, subject of the King of Italy, residing at Oneida, in the county of Madison and State of New York, have invented certain new and useful Improvements in Feed Boxes for Bees, of which the following is a specification.

The present invention relates to a box attachment adapted to be secured on the front wall of a bee hive and the object of the invention is to use this box for supplying the bees with food particularly during the winter months and in case they have been deprived of all their honey.

Another object of the invention is to construct this feed box in such a manner that, although filled from the outside, no other insects can enter through the box and carry away the food supplied for the bees.

Still another object is to dispose and construct the feed box, so that the bees may be compelled to take out the food little by little and that it will not run out over the walls and floor of the bee hive.

One embodiment of the invention is illustrated in the accompanying drawings, while—

Fig. 1 represents a fragmentary perspective front view of a bee hive with the device attached;

Fig. 2 is a transverse section of the bee hive showing the feed box from the inside and Fig. 3 is a vertical section of the front wall of a bee hive with the feed box inserted therein.

Reference numeral 10 represents a bee hive of the usual construction provided with a platform 11 on which the bees alight to enter through the door opening 12. A little above the door opening is cut a rectangular opening 13 adapted to receive the feed box. The feed box proper 14 consists of a receptacle 15 fitting in the opening 13, so that the inner or rear wall 16 comes flush with the inner surface of the front wall 17 of the bee hive. The inner wall 16 is, however, of slightly less height than the opening so that an entrance 18 in the shape of an elongated slit is furnished between the top edge of the opening 13. This entrance is provided for the purpose of permitting the bees to enter the receptacle to carry away the food collected in the bottom thereof. The outer wall 19 of the receptacle is extended on all sides to form a frame 20 around the opening 13 and this frame is attached to the front wall of the bee hive by means of screws 21 or the like.

Slanting upwardly from the front wall 19 of the receptacle and rigidly secured thereto or forming an integral part thereof, is seen a hopper 22 having an aperture 23 which is adapted to be closed by means of a door or lid 24 hinged as at 25 and furnished with a lock or latch 26 on the lower side. In the lower end of the hopper a series of narrow passages 27 are provided in the front wall 19 of the receptacle for the purpose of permitting the food deposited in the hopper to trickle through passages 27 into the receptacle 15. These passages 27 are not large enough to permit the bees to pass through the same.

The food for the bees, which is of the consistency of honey and usually consists of molasses or some similar food stuff, is poured into the hopper after the lid 24 has been opened and may be filled up to the forward edge of the hopper when it will gradually enter the receptacle 15. The bees will immediately notice the presence of this food and pass through the entrance 18 to carry away the food from the receptacle. As soon as the hopper has been filled the lid 24 is again closed and locked.

It will be evident that the shape and construction of the feed box may be changed without departing from the scope of the invention and that for instance in some cases it may be preferable to furnish a hopper at one end of the receptacle instead of in the front wall thereof or to have the hopper detachably secured to the receptacle.

Having thus described the invention what is claimed as new is:

The combination with a bee hive having an aperture in one of its walls; of a feed box therefor comprising a receptacle fitting snugly in said aperture, open across its upper end providing an entrance for bees, a filling hopper attached to one side of said receptacle, passages provided between the receptacle and the hopper above the bottom of said receptacle for food supply, said hopper having inclined top and bottom walls, a frame formed on one side of the receptacle adapted for attachment to the bee hive.

In testimony whereof I affix my signature.

BIAGIO TROILO. [L. S.]